(12) United States Patent
Petrotto

(10) Patent No.: US 7,022,921 B2
(45) Date of Patent: Apr. 4, 2006

(54) ELECTRONIC SCALE ASSEMBLY HAVING INCORPORATED SPREADER ARM

(75) Inventor: Gerald J. Petrotto, Williamsville, NY (US)

(73) Assignee: SR Instruments, Inc., Tonawanda, NY (US)

( * ) Notice: Subject to any disclaimer, the term of this patent is extended or adjusted under 35 U.S.C. 154(b) by 254 days.

(21) Appl. No.: 10/446,607

(22) Filed: May 28, 2003

(65) Prior Publication Data

US 2004/0238230 A1    Dec. 2, 2004

(51) Int. Cl.
*G01G 19/52* (2006.01)
*G01G 19/14* (2006.01)

(52) U.S. Cl. ..................................... 177/144; 177/147
(58) Field of Classification Search ............... 177/126, 177/144, 147, 229, 245
See application file for complete search history.

(56) References Cited

U.S. PATENT DOCUMENTS

| 2,990,899 | A | * | 7/1961 | De Bella ..................... 177/139 |
| 4,420,052 | A | * | 12/1983 | Hale .......................... 177/132 |
| 4,482,783 | A | * | 11/1984 | Laimins ...................... 177/147 |
| 4,799,562 | A | * | 1/1989 | Burrows et al. ............. 177/229 |
| 5,033,563 | A | * | 7/1991 | Brainerd et al. ............ 177/132 |
| 5,591,943 | A | * | 1/1997 | Cheng ......................... 177/147 |
| 6,303,882 | B1 | * | 10/2001 | Stephens et al. ............ 177/147 |
| 6,774,320 | B1 | * | 8/2004 | Simons ....................... 177/147 |

* cited by examiner

*Primary Examiner*—Randy W. Gibson
(74) *Attorney, Agent, or Firm*—Peter J. Bilinski

(57) ABSTRACT

An electronic scale/spreader arm assembly for use with an apparatus includes an axial force transducer, such as a load cell, that is attachable to the apparatus. A spreader bar is configured to receive a support wherein the spreader bar and the load cell are interconnected such that the load cell is pivotally attached to the apparatus and the spreader arm is pivotally attached to the support while the spreader arm and the load cell are attached to one another such that non-axial loads imparted to the spreader arm will not be transmitted to the axial force transducer.

13 Claims, 5 Drawing Sheets

ELECTRONIC SCALE ASSEMBLY HAVING INCORPORATED SPREADER ARM

FIELD OF THE INVENTION

This invention relates to the field of weight measurement, and more particularly to an electronic scale assembly that is directly integrated or can be added to an apparatus, such as, for example, a patient transfer device.

BACKGROUND OF THE INVENTION

Portable apparatus, such as, for example, patient lifting devices are well known in the medical field for transferring patients between varying locations, such as, for example, between a bed and a gurney or between a test station and a wheelchair. These devices commonly include a base section having an attached hydraulic or other form of lifting mechanism. This lifting mechanism typically includes an boom arm having an articulating end that is attached by means of a spreader arm, bar or other load supporting member to a body sling, wheelchair, or similar lifting patient support. The spreader arm attempts to evenly distribute the weight of the patient support and includes receiving means on opposing ends to which straps or other connecting means from the patient support are attached. Stationary types of the above devices, such as ceiling mounted versions, are also commonly known in the field.

There are several manufacturers of various apparatuses, such as the above noted patient lifting devices and patient transfer devices that now each use an electronic scale as an accessory to their lifts. These electronic scales are discrete assemblies that separately incorporate a tensile load cell or similar axial force transducer whose output can be converted for readout onto a display. Though some success has been achieved in having an electronic scale with a patient lifting device, there are a number of disadvantages in using "off the shelf" electronic scales in conjunction therewith.

A first noted disadvantage in incorporating so-called "off the shelf" electronic scale assemblies is that the overall lifting height of the lifting device is decreased because the scale accessory is typically attached between the lift boom and the spreader bar or other load supporting member. This attachment decreases the overall effectiveness of the patient lifting device and also increases the overall lifting height and the angle of the lift boom which may also adversely affect the center of gravity of the device.

A second disadvantage created in using an attached electronic scale is that inaccuracies are induced into the scale because the scale is restricted from movement in at least one or more directions. When electronic scales having a tensile load cell or similar axial force transducer design are not permitted to hang freely from the lift boom, a side load or torque is created, thereby skewing the pure tensile load that is created by the patient. As a result, indirect loads are transmitted to the electronic scale assembly and inaccurate readings are displayed.

Yet a third disadvantage is that there are other inaccuracies that can be induced into the electronic scale when the scale is not oriented vertically. That is to say, if the line of force through a load cell is not vertical, an error is produced that is proportional to the horizontal force component. The latter problem is also produced when attempting to incorporate an electronic scale into a spreader bar or other load supporting member.

There are additional problems or disadvantages which arise when attempting to incorporate an electronic scale into a spreader bar. For example, if the spreader bar travel is restricted, side loads will be introduced. In addition and if the spreader bar permits the patient's center of gravity to travel outside of the support structure of the patient lifting device, the device could become unstable wherein possible serious injury could result.

SUMMARY OF THE INVENTION

It is therefore a primary object of the present invention to overcome the above-noted deficiencies of the prior art.

It is another primary object of the present invention to introduce an electronic scale assembly that can be directly incorporated into an apparatus, such as, for example, a patient lifting device without adding height to the device or reducing the overall height capability of the device.

It is yet another primary object of the present invention to provide an apparatus, such as a patient lifting or transfer device, having an incorporated electronic scale assembly which is more reliable and efficient than otherwise merely adding "off the shelf" scale accessories onto a similar patient lifting or transfer device or other apparatus such as those that simply measure applied weights without a lifting or transfer mechanism but are capable of receiving or transmitting eccentric or off-center loads.

Therefore and according to a preferred aspect of the present invention, there is provided a scale assembly including:

an axial force transducer having a primary load axis extending through the center of said transducer, said axial force transducer being pivotally attached to a support member; and a load supporting member including means on opposing sides thereof for supporting a load wherein said load supporting member is pivotally attached to said axial force transducer along at least one pivot axis that is orthogonal to the primary load axis and extends substantially through the center of said axial force transducer wherein; components of said supported load other than axial loads transmitted along said primary load axis are not transmitted to said axial force transducer.

Preferably, the load supporting member can freely pivot about at least one axis that is located in a plane that is substantially orthogonal to the primary load axis of the axial force transducer while the transducer remains supported in an axial orientation so as not to import any induced side loads or torque skewing to the transducer.

In addition, the load supporting member is preferably maintained at the same height relative to the axial force transducer of the scale assembly. In a preferred embodiment, the load supporting member is maintained in a plane at the center of an axial force transducer cell. Therefore, the scale assembly does not substantially reduce the lifting range of an apparatus, such as a patient/lift transfer device.

In a preferred version, the axial force transducer is disposed within an inner supporting member and the load supporting member, supporting a load, is defined by the load supporting member housing each of the inner supporting member and axial force transducer.

The load supporting member is and inner supporting member pivotally attached to the axial force transducer through at least one axis extending substantially through the center of said axial force transducer and in a plane that is orthogonal to the primary load axis; and supporting a load on said load supporting member in this configuration.

More preferably, the scale assembly includes electronics including a display in which the load output can be read by the user. The apparatus can further include means for detecting when the load supporting member has pivoted beyond a predetermined angular position relative to the apparatus.

According to yet another preferred aspect of the present invention, there is provided a patient lift/transfer apparatus comprising:

a lift mechanism for lifting a patient;
a load supporting member attached to said lift mechanism; and
an electronic scale assembly including an axial force transducer having a primary load axis extending through the center of said transducer, said axial force transducer being pivotally attached to said lift mechanism and means for pivotally attaching said load supporting member to said axial force transducer about at least one pivot axis permitting said load supporting member to freely pivot about said at least one pivot axis, while said axial force transducer is maintained in said axial orientation, said at least one pivot axis being orthogonal to said primary load axis and extending substantially through the center of said axial force transducer.

According to yet another preferred aspect of the present invention, there is provided a method for isolating non-axial forces from an axial force transducer in an apparatus, said axial force transducer having a primary load axis extending through the center of said transducer, said method including the steps of:

mounting said axial force transducer to said apparatus;
attaching a load supporting member to said axial force transducer, said load supporting member being pivotally attached to said transducer through at least one pivot axis extending substantially through the center of said transducer and in a plane orthogonal to the primary load axis; and supporting a load on said load supporting member wherein non-axial loads are not transmitted to said axial force transducer.

An immediate and substantial advantage of the scale assembly of the present invention is that an electronic scale can be incorporated or integrated into any suitable apparatus without introducing substantial loss of height thereto.

A further advantage of the present invention is that the mounting of the load supporting member relative to the load cell or other axial force transducer of the scale assembly minimizes the inducement of side loads being transmitted to the transducer and therefore produces improved accuracy and greater reliability than previously known "accessory" type devices.

These and other objects, features and advantages will become apparent from the following Detailed Description which should be read in conjunction with the accompanying drawings.

DETAILED DESCRIPTION

The following description refers to a specific embodiment of an electronic scale assembly that is incorporated into an apparatus. In the following embodiments, a specific patient lifting or transfer device is utilized. It will be readily apparent from the following discussion, however, that there are a varied number of designs of other suitable weight measurement systems that may or may not include lifting mechanisms and other forms of patient transfer devices, such as, for example, ceiling mounted versions, that can be effectively utilized incorporating the inventive aspects and features of the present electronic scale assembly. In addition, certain terms are used throughout the course of discussion, such as "top", "bottom", "lateral", "horizontal", "transverse", "orthogonal", "axial" and the like that are used merely to provide a frame of reference with regard to the accompanying figures. These terms, however, are not intended to be overly limiting of the claimed invention.

Figure 1:
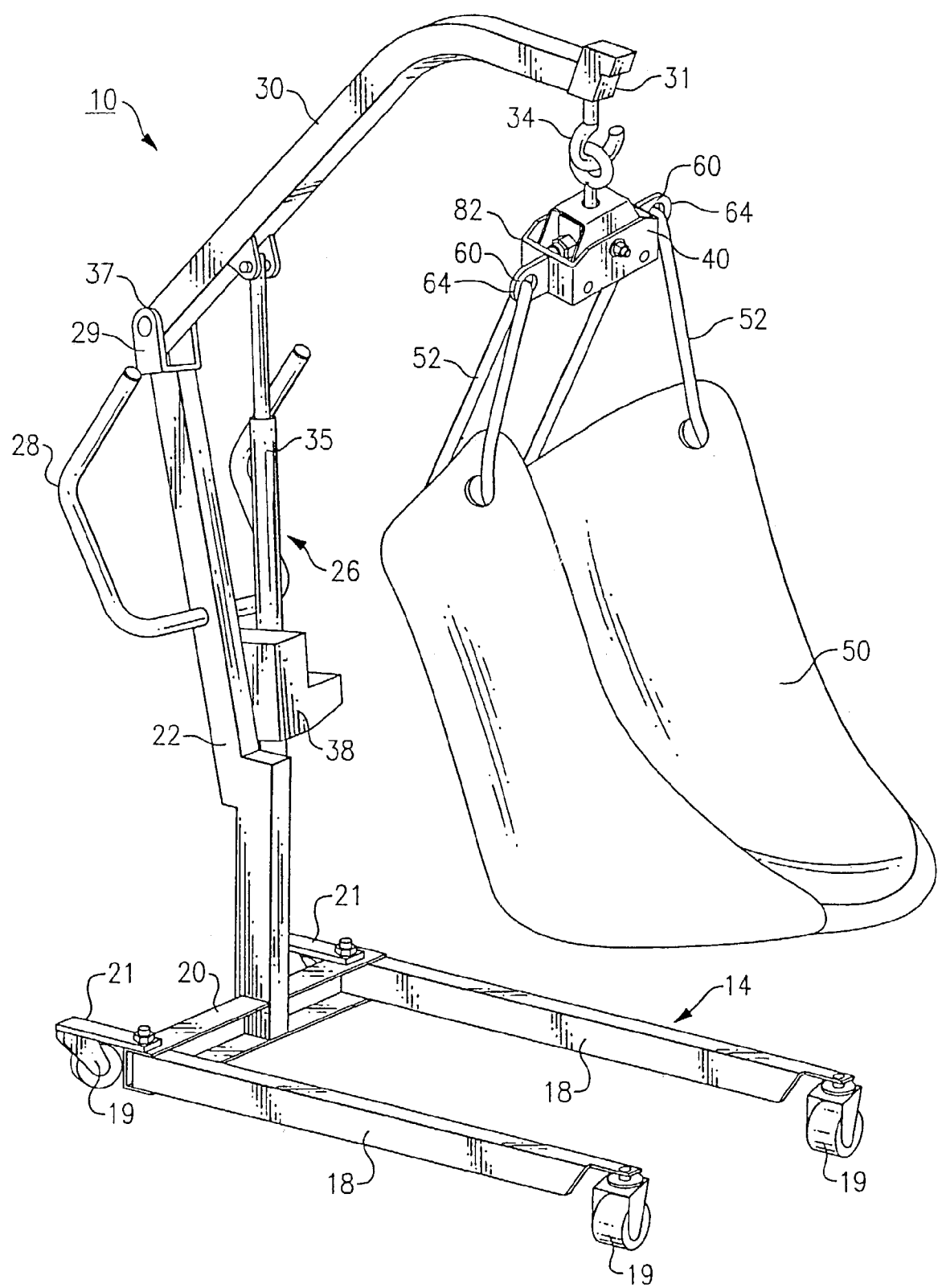
FIG. 1 is a partial isometric view of the lifting mechanism of a patient lifting device illustrating the incorporated electronic scale assembly according to a preferred embodiment of the present invention.

Referring to FIG. 1, there is shown a patient lifting or transfer device 10. This lifting device 10 comprises a bottom base assembly 14 that includes a pair of long parallel base sections 18 and a pair of short parallel base sections 21, each pair of sections extending horizontally from a transverse support beam 20 wherein the long parallel base sections form a substantially U-shaped support configuration. A support post 22 extends vertically from the center of the span of the transverse support beam 20, an upper portion of which is angled outwardly with respect to the long parallel sections 18 of the base assembly 14 and including a yoke 29 at its upper end.

A lift mechanism 26 pivots on the support post 22 and extends to an articulating boom arm 30 that is caused to move along a predetermined travel path by means of a hydraulic lift cylinder 35 having one end that pivotally engages an intermediate portion of the boom arm, the boom arm being pivotally supported at the yoke 29 located at the top of the support post 22 at a proximal end 37, the mechanism being operable by a controller 38. A handle assembly 28 is further attached by conventional means to the angled portion of the support post 22 at a convenient height to permit the patient lifting device 10 to be movable, each of the parallel sections 18, 21 of the base assembly 14 including casters 19 at their respective ends opposite the transverse support beam 20 to permit movement of the device along a substrate (not shown).

The articulating boom arm 30 of the lift mechanism 26 extends upwardly and inwardly relative to the parallel base sections 18 of the base assembly 14 and includes a distal end 31. The distal end 31 of the arm 30 extends outwardly to a distance which is not outside that of the ends of the long parallel sections 18 in order to maintain overall stability of the device 10. The distal end 31 also includes an engagement member such as a hook or clevis 34, that is used for pivotally supporting an electronic scale/load supporting member assembly 40, described in greater detail below, which in turn is used to support a patient, such as by means of a body sling 50 or other patient support, the sling being attached by sets of straps 52 disposed on lateral sides thereof to the assembly 40 through corresponding eyelets 60 that are provided on extending attachment portions 64 that are provided on opposing sides of a load supporting member, in this instance, a spreader bar 82, also as described in greater detail below.

It should be reemphasized that there are a number of varying patient supports as well as an accompanying varied number of spreader bar and load supporting member designs that are complementary to those supports depending, for example, on whether the patient alone is to be lifted from a gurney, a bed, a pool, a vehicle or other station or a patient including a wheelchair, for example, is to be lifted, and other factors. The preceding, therefore, is only intended to be an example of a suitable patient support for use with the herein described invention.

Figure 2:
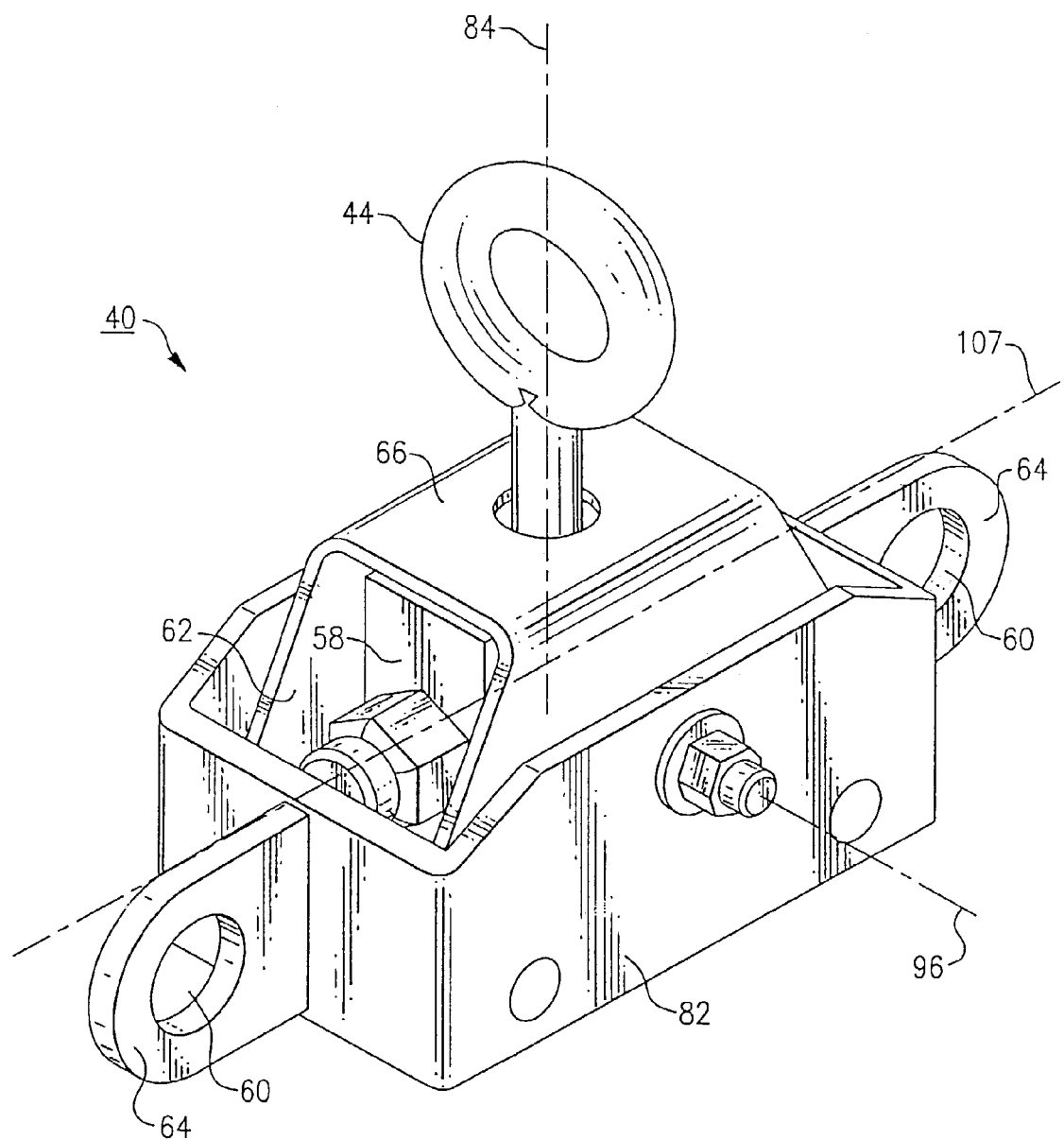
FIG. 2 is a front isometric view of the patient lifting device of FIG. 1.
Figure 3:
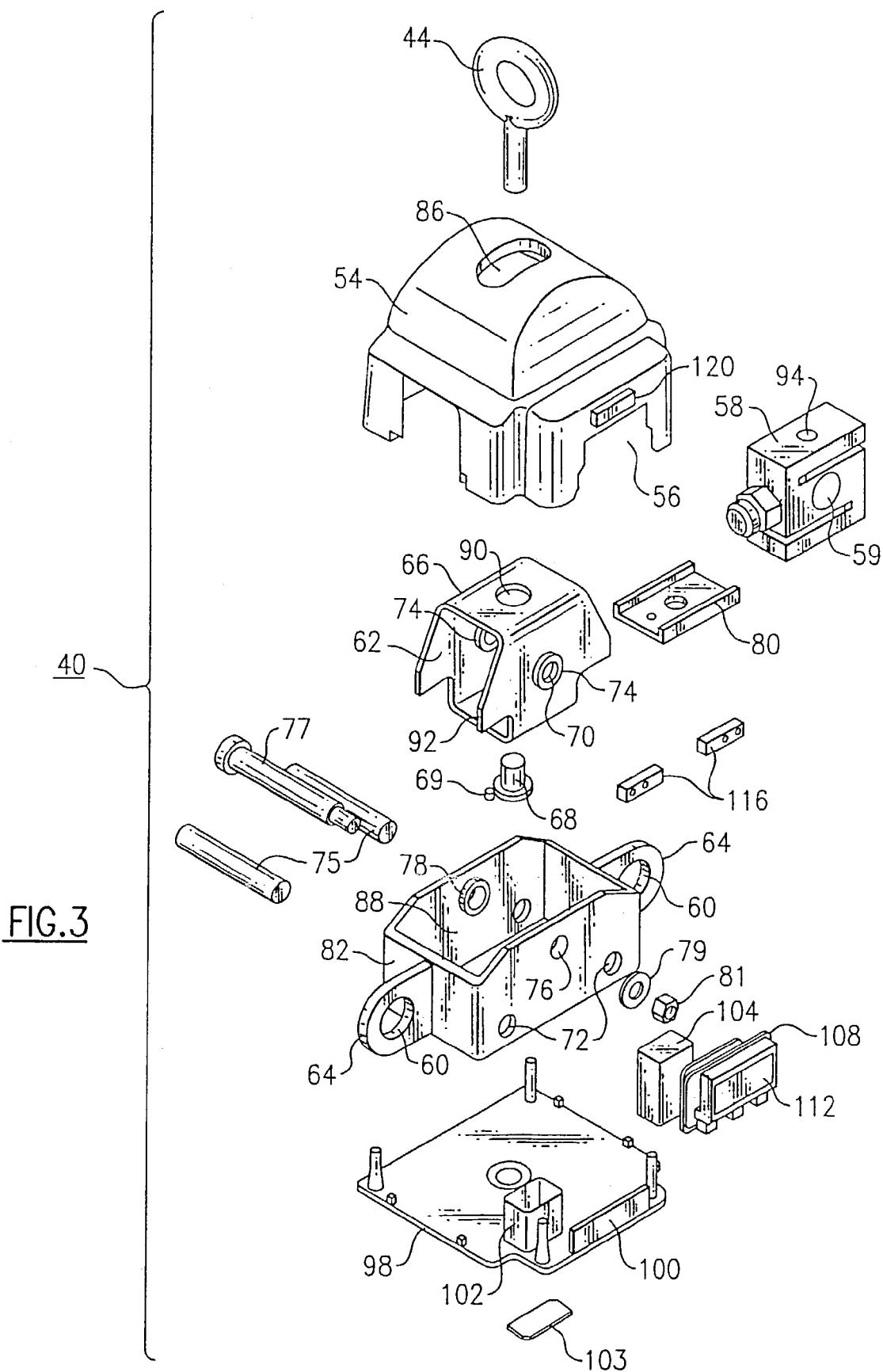
FIG. 3 is an exploded front isometric view of the electronic scale assembly of FIGS. 1 and 2.

Turning to FIGS. 2 and 3, additional details regarding the electronic scale/load supporting member assembly 40 in accordance with this embodiment are herein provided. This assembly 40 is defined by two major subassemblies, namely a spreader bar subassembly and a scale subassembly that are integrated together within a casing 54, shown only in FIG. 2. The scale subassembly includes a tensile load cell 58, such as a SR Instruments Model—SM 7394 or other similarly known axial force transducer that is disposed within a first or inner supporting member 66. The casing 54 further includes a bottom plate 98, also only shown in FIG. 3, which defines an enclosure for the entire assembly 40. The scale subassembly further includes sensing and display means such as a printed circuit board 108 containing a microprocessor as well as a display 112 that are each disposed within a space between a wall 100 and a battery compartment 102 to one side of the top of the bottom plate 98 of the casing 54 and are operatively coupled to the output of the tensile load cell 58, the display being located relative to a slot 56 in the casing 54 where it can seen by a user following assembly thereof.

The bottom plate 98 further includes the battery compartment 102 for retaining a nine-volt alkaline or other suitable battery 104 for powering the components of the scale subassembly and including a removable cover 103. It should be pointed out that details relating to load cells and other axial force transducers and to their electrical interconnection to an output display through relevant circuitry are commonly known in the field and do not form a novel part of this invention. The mechanical interconnection of the tensile load cell 58 to the assembly 40 and to the load supporting member, however, shall now be described in greater detail for purposes of this embodiment. As such, FIGS. 1, 2 and 4 do not illustrate the casing 54 or bottom plate 98 in order to more clearly depict and amplify discussion relating to these features.

Still referring to FIGS. 2 and 3, the scale subassembly further includes the first or inner supporting member 66 that includes a tubularly shaped cavity 62 into which the load cell 58 is disposed. This member 66 is defined by a pair of open ends, a pair of opposing lateral sides and a bottom and top surface, respectively.

A support member 44 extends through an opening 86 that is provided in the top surface of the casing 54, the support member being capable of engaging the engagement member 34 extending from the distal end 31, FIG. 1, of the articulating boom arm 30, FIG. 1. The support member 44 extends downwardly through openings 90 and 94 into the top surface of the tensile load cell 58 respectively, thereby retaining the load cell 58 in a substantially stationary, but pivotable position relative to the boom arm 30. Moreover, the load cell 58 according to this configuration is mounted such that the load cell's primary load axis 84 (e.g., the axis defining where tensile loads are applied) is substantially vertical, as dictated by the position of the distal end 31, FIG. 1, of the boom arm 30, FIG. 1.

A spacer plate 80 is mounted to the exterior of the bottom surface of the inner supporting member 66 for positioning the load cell 58 within the inner supporting member. The spacer plate 80 is mounted in overlaying relation onto the exterior of the bottom surface of the inner supporting member 66 and includes openings for securing the plate to the bottom of the load cell 58 using a set screw 68 or other suitable fastener(s). An adjacent set screw 69 is used for lateral alignment thereof.

A first pair of aligned openings 70 are respectively provided on the opposing lateral sides of the inner supporting member 66. A first pair of bearings 74 are disposed in each of these openings 70. In addition, the tensile load cell 58 includes an axial opening 59 extending through the body of the load cell which when properly positioned within the cavity 62 of the inner supporting member 66, is aligned with the openings 70. The purposes of each of these openings 59, 70 will be described in greater detail below.

Still referring to FIGS. 2 and 3, the load supporting member 82, includes a housing defined by an open-top cavity 88 that is sized for receiving each of the inner supporting member 66 and contained tensile load cell 58. A second pair of aligned openings 76 are provided on respective opposing lateral sides, these openings being further aligned with the first pair of aligned openings when the first supporting member 66 is placed within the cavity 88 and in which bushings or bearings 78 are mounted within each opening.

The load supporting member 82 includes a set of extending attachment portions 64 on opposing end sides thereof, each of the extending attachment portions including eyelets 60 sized for receiving the straps 52, FIG. 1, of the body sling 50, FIG. 1. It should be noted that the load supporting member can include multiple configurations, including those in which the extending attachment portions are angularly "swept down" from a primary section of the subassembly that is aligned like the supporting member 82 relative to the tensile load cell 58.

The load supporting member 82 is mounted so as to be pivotally mounted relative to the scale subassembly and more particularly to the load cell 58. According to this embodiment, the openings 70 in the inner supporting member 66 and the load supporting member 82 retaining the tensile load cell 58 extend along a pivot axis 96 which is substantially perpendicular (e.g. horizontal) to the force axis 84 of the load cell 58. A shoulder screw 77 or other suitable form of fastener is positioned through each of the openings 76, 70 and 59 of the load supporting member, inner supporting member 66 and the tensile load cell 58, respectively, the screw being retained in place by a washer 79 and nut 81 combination though it should be readily apparent that other suitable fasteners and retaining means can be utilized. A pair of additional openings 72 are provided on each lateral side of the load supporting member 82 that are aligned together. A pair of axial rods 75 are routed through the openings 72, wherein the rods limit the inner supporting member 66 and load cell 58 from pivoting along axis 96, wherein the inner supporting member includes a spaced portion to permit the passage of the rods 75 as bordered by upper edges 92. A pair of limit switches 116 are operatively coupled to the display electronics to indicate when the upper edges 92 of the inner supporting member 66 contacts the axial rods 75 at a predetermined angular position.

Figure 4:
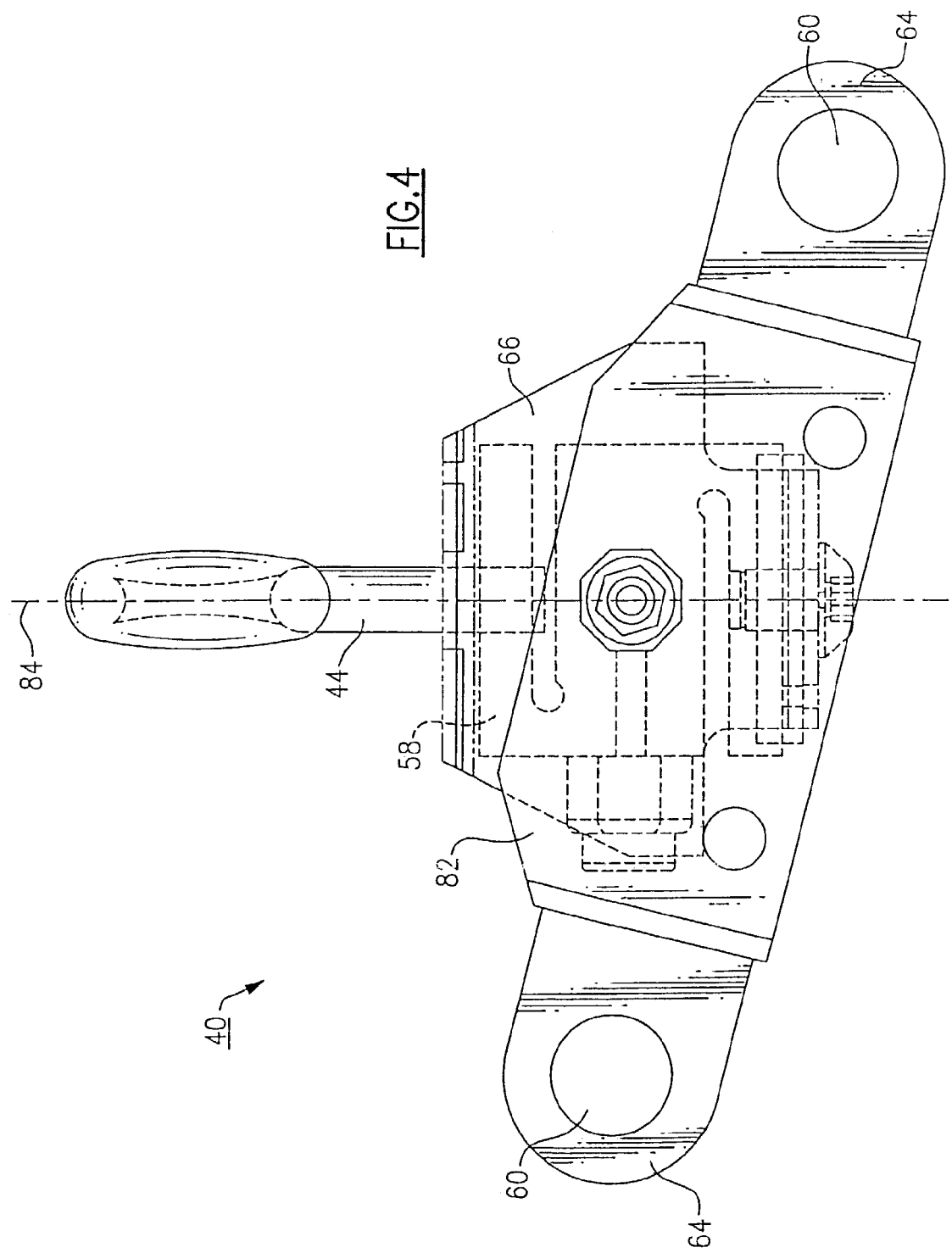
FIG. 4 is a partial front view of the electronic scale assembly of FIGS. 1–3 illustrating the pivot ability of the spreader arm portion relative to a vertically oriented load cell.

In this position as shown most clearly in FIG. 4, and according to this embodiment, the center of the load cell 58 is co-planar with the the load supporting member 82, as shown more clearly in FIG. 4, and therefore there is no increase in height required to incorporate the load cell 58 into the lifting mechanism 26. As previously noted, the line of force axis 84 of the tensile load cell 58 is substantially vertical depending on the position of the distal end 31 of the articulating boom arm 30, based on the pivotal attachment between the scale subassembly and the engagement member 34 with the load supporting member 82 being freely pivotal about the pivot axis 96 extending through the center of the tensile load cell 58 and being further movable along with the remainder of the electronic scale assembly 40 in at least two other degrees of freedom, that is, being rotatable 360 degrees about the horizontal plane (that is the plane which is orthogonal to the force axis 84), as well pivoting about the axis 107 (in this configuration, in a direction which is orthogonal to the force axis 84 and the pivot axis 96) of the boom arm 30.

In use and referring to the Figs, the lifting mechanism 26 is used in a conventional manner using the articulating boom arm 30 and hydraulic lift mechanism 26 to transfer a patient (not shown) that is placed in the body sling 50. Upon the addition of weight, the tensile load cell 58 is acted upon and detects the vertical tensile force acting thereupon. It should be noted that though the 82 according to this embodiment spans only approximately 5–8 inches between the eyelets 60 of the extending attachment portions 64, this distance can easily be varied. For example and according to a preferred embodiment, a load supporting member includes a total span of about 30–38 inches.

If the weight is unbalanced; that is, if the patient is not centered on the body sling 50, FIG. 1, the effect of which is shown in FIG. 4, an eccentric load is developed. However, because of the pivotal mounting of the load supporting member 82 through the center of the tensile load cell 58, only the axial (e.g. vertical) components of these applied loads are transmitted for display by the electronics of the scale.

It should be noted that in the present embodiment, the boom arm 30 of the lifting apparatus can also pivot, according to axis 107, depicted pictorially in FIG. 2, in a fore and aft movement. During this pivoting, the load cell 58 is no longer vertical as defined herein and hence creating the potential measurement error caused by the creation of a non-axial force component. This can occur, for example, if the patient were not to remain centered in the body sling 50, particularly if the patient were to assume an extreme fore or aft position. Similar off-center loading can be visualized for other forms or applications of apparatuses for which the above scale assembly, when incorporated therewith, can be proved as useful.

Referring to FIG. 3, one possible method for preventing or at least minimizing the contributions of excessive fore and aft movements of the scale assembly, FIG. 1, from overly contributing to the tensile load cell 58 would be to install a sensor 120 for determining when the scale assembly has reached an angle that is deemed sufficient to affect the required accuracy of the scale. Sensor 120 according to the present embodiment is a bubble-type level sensor mounted to the exterior of the scale assembly, though it should be apparent that other suitable forms of detection can easily be substituted.

According to a another preferred embodiment or technique and referring to the orientations shown in FIG. 2, and other than supplying a means for detecting whether excessive fore and aft movement has been effected, the load supporting member could be redesigned to permit pivoting about the axis 107 by redesigning each of the inner and outer supporting members so as to create a pivot axis that is parallel with axis 107. For example, one possible design would essentially be an assembly almost identical to the scale assembly 40, but with the lateral and end sides thereof essentially reversed.

According to another alternate embodiment in accordance with the present invention, an electronic scale assembly is designed to permit pivoting anywhere along the horizontal plane of the boom pivot.

Figure 5:
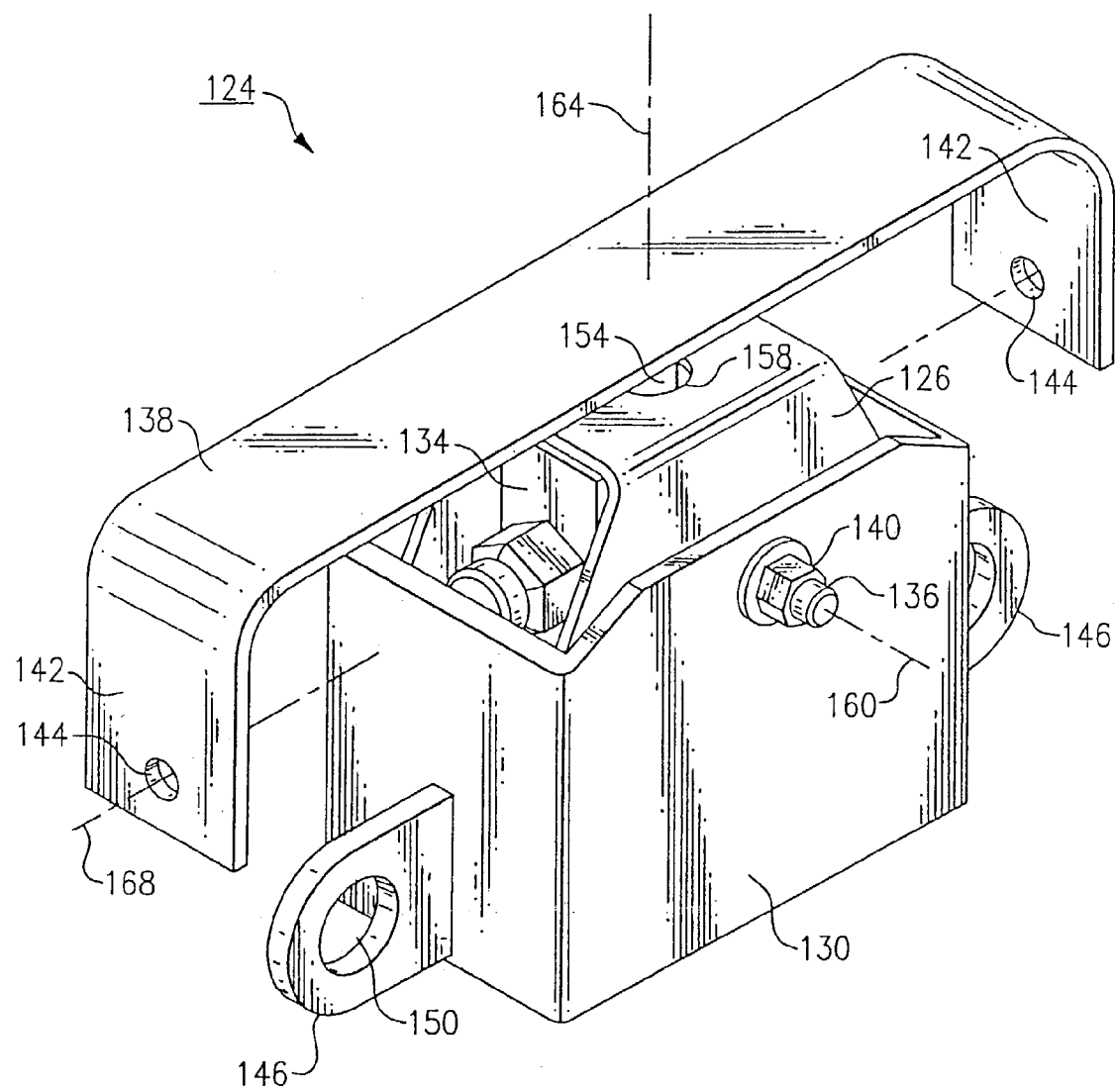
FIG. 5 depicts a partial front isometric view of an electronic scale assembly in accordance with another preferred embodiment of the present invention.

An example is depicted in FIG. 5. The electronic scale assembly 124 of this embodiment is similar to that previously described and includes an inner supporting member 126 that is held within an appropriately sized cavity of load supporting member 130. An axial force transducer, such as tensile load cell 134, is retained within a retaining cavity of the inner supporting member 126. A housing or casing is also included that covers the entirety of the assembly 124, but is not shown for the sake of clarity. A pivoting mounting bracket 138 is attached to the tensile load cell 134 by means of a mounting stud 154 fixedly attached at the center of the span of the bracket, the stud 154 being fixedly attached to the top of the tensile load cell provided through an opening 158 in the upper supporting member 126.

The pivoting mounting bracket 138 is essentially U-shaped and includes a pair of downwardly depending sections 142 at either end thereof, each depending section including attachment points 144 to permit attachment to a supporting structure, such as a patient lifting boom (not shown) or other structure.

The tensile load cell 134 is pivotally attached to the inner supporting member 126 in a manner similar to that previously described in FIG. 2 by means of a shoulder screw or suitable fastener(s) passing through the center of the load cell 134 through a wall of the load supporting member 130 through a pivot axis 160 and secured by means of a nut 140. The tensile load cell 134, like the preceding, is defined by a primary load axis 164 extending substantially vertically, also as previously described.

The load supporting member 130 is pivotally supported by the shoulder screw 136 and like the preceding embodiment of FIGS. 2–4 includes a spreader bar for supporting a load (not shown), defined essentially by the load supporting member 130 that includes a pair of opposing extending attachment portions 146, each attachment portion having an eyelet 150, the extending attachment portions being provided on opposite lateral walls of the load supporting member 130 that are 90° to the pivot axis 160.

The load supporting member 130 of this embodiment is somewhat larger in height than the preceding version of FIGS. 2–4. In this assembly, the attachment points 144 of the downwardly extending portions 142 of the pivoting mounting bracket 138 are aligned with the center of the tensile load cell 134 through axis 168 wherein pivot axes 168 and 160 are coplanar at the center of the tensile load cell.

PARTS LIST FOR FIGS. 1–5

10 patient lifting device
14 bottom base assembly
18 long base sections
19 casters
20 transverse support beam
21 short base sections
22 support post 26 lift mechanism
28 handle assembly
29 yoke
30 articulating boom arm
31 distal end
34 engagement member
35 hydraulic lift cylinder
37 proximal end
38 controller
40 electronic scale assembly
43 arrows
44 support member
48 top surface
54 casing
56 slot
58 tensile load cell
59 axial opening
60 eyelets
62 cavity
64 extending attachment portions
66 first or inner supporting member
68 set screw
69 set screw
70 openings
72 openings
74 bearings
75 axial rods
76 openings
77 shoulder screw
78 bearings
79 washer
80 spacer
81 nut
82 load supporting member
84 force axis
86 top opening
88 cavity
90 opening
92 upper edges
94 opening
96 pivot axis
98 bottom plate
100 wall
102 battery compartment
103 cover
104 battery
107 pivot axis
108 printed circuit board
112 display
116 limit switches
120 sensor
124 electronic scale assembly
126 inner supporting member
130 load supporting member
134 tensile load cell
136 shoulder screw
138 pivoting mounting bracket
140 nut
142 downwardly depending portions
144 attachment points
146 extending attachment portions
150 eyelets
154 mounting stud
158 opening
160 axis, pivot
164 primary load axis
168 axis, pivot While the present invention has been particularly shown and described with reference to the preferred mode as illustrated in the drawings, it will be understood by one killed in the art that various changes in detail may be effected therein without departing from the spirit and scope of the invention as defined by the claims.

We claim:

1. A scale assembly including:
an axial load transducer having a primary load axis extending through the center of said transducer, said axial force transducer being pivotally attached to a support member; and
a load supporting member including means on opposing sides thereof for supporting a load wherein said load supporting member is pivotally attached to said axial force transducer along at least one pivot axis that is orthogonal to the primary load axis and extends substantially through the center of said axial force transducer wherein components of said supported load other than axial loads transmitted along said primary load axis are not transmitted to said axial force transducer.

2. A scale assembly as recited in claim 1, wherein said axial force transducer is disposed within an inner supporting member and said load supporting member is defined by a housing sized for retaining each of said inner supporting member and said axial force transducer.

3. A scale assembly as recited in claim 1, wherein said scale assembly is an electronic scale assembly wherein the output of said axial force transducer is displayed.

4. A scale assembly as recited in claim 1, including means for detecting when said load supporting member has pivoted beyond a predetermined angular position.

5. A scale assembly as recited in claim 1, wherein said assembly is used in a patient lifting apparatus.

6. A patient lift/transfer apparatus comprising:
a lift mechanism for lifting a patient;
a load supporting member attached to said lift mechanism; and
an electronic scale assembly including an axial force transducer having a primary load axis extending through the center of said transducer, said axial force transducer being pivotally attached to said lift mechanism and means for pivotally attaching said load supporting member to said axial force transducer about at least one pivot axis permitting said load supporting member to freely pivot about said at least one pivot axis, while said axial force transducer is maintained in said axial orientation, said at least one pivot axis being orthogonal to said primary load axis and extending substantially through the center of said axial force transducer.

7. An apparatus as recited in claim 6, wherein said load supporting member is substantially coplanar with said axial force transducer in a plane that is substantially orthogonal with said primary force axis of said axial force transducer.

8. An apparatus as recited in claim 6, wherein said axial force transducer and said load supporting member are pivotally attached to said lift mechanism.

9. An apparatus as recited in claim 8, including at least one sensor for determining when said lift mechanism has caused said axial force transducer to have pivoted beyond a predetermined position.

10. A method for isolating non-axial loads from an axial load transducer in an apparatus, said method including the steps of:

mounting an axial force transducer to said apparatus, said force transducer having a primary load axis extending through the center of said transducer;

attaching a load supporting member to said axial force transducer, said load supporting member being pivotably attached to said axial force transducer through at least one pivot axis extending substantially through the center of said transducer and in a plane orthogonal to the primary load axis; and supporting a load on said load supporting member wherein non-axial loads are not transmitted to said axial force transducer.

11. A method as recited in claim 10, including the step of disposing said load supporting member substantially coplanar with the plane that is orthogonal to said primary load axis of said axial force transducer.

12. A method as recited in claim 10, including the step of detecting when said load supporting member has pivoted beyond a predetermined position.

13. A method as recited in claim 10, including the step of pivotally mounting said axial force transducer to said apparatus.

* * * * *

UNITED STATES PATENT AND TRADEMARK OFFICE
CERTIFICATE OF CORRECTION

PATENT NO. : 7,022,921 B2  Page 1 of 1
APPLICATION NO. : 10/446607
DATED : April 4, 2006
INVENTOR(S) : Gerald J. Petrotto It is certified that error appears in the above-identified patent and that said Letters Patent is hereby corrected as shown below:

TITLE PG. ITEM (54) TITLE, AND PG 1, LINE 1-2, please delete the title replace with -- ELECTRONIC SCALE ASSEMBLY HAVING INCORPORATED LOAD SUPPORTING MEMBER --

Signed and Sealed this

Twenty-second Day of August, 2006

JON W. DUDAS
*Director of the United States Patent and Trademark Office*